3,708,506
MANUFACTURE OF EPOXY COMPOUNDS BY REACTION OF OLEFINS WITH HYDROPEROXIDES AND BORATE ESTERS IN SITU
Jean-Claude Brunie and Noel Crenne, Lyon, France, assignors to Rhone-Poulenc S.A., Paris, France
No Drawing. Filed May 27, 1966, Ser. No. 553,305
Claims priority, application France, June 1, 1965, 19,140
Int. Cl. C07d 1/08
U.S. Cl. 260—348.5 L    14 Claims

ABSTRACT OF THE DISCLOSURE

Expoxidized compounds are prepared by heating olefinic compounds with organic hydroperoxides to not above 125° C. in the presence of a borate ester.

---

This invention relates to the manufacture of epoxy compounds by oxidation of olefinic compounds.

The most frequently used industrial process for the manufacture of epoxides comprises reacting olefinic compounds with peracides such as performic acid, peracetic acid, perbenzoic acid etc. (Adams, Organic Reactions VII, pp. 378–433 (1953)). This method gives good yields but it uses expensive oxidising agents; furthermore it necessitates working in an acid medium, which is not always compatible with the stability of the products which have to be treated. In order to avoid these disadvantages, the organic peracids have been replaced by alkyl hydroperoxides [Brill, Journal Organic Chemistry 29, 710–713, (1964)], but the formation of epoxide then takes place only very slowly and with poor yields. Thus in the case of the cyclo-olefines which Brill oxidised by means of t.-butyl hydroperoxide, the yields were 10 to 30% based on the hydroperoxide consumed.

It has now been found that if an olefinic compound is reacted with an organic hydroperoxide of formula ROOH, in which R represents an alkyl, cycloalkyl or aralkyl radical, in the presence of a borate ester, the epoxide corresponding to the olefinic compound being treated can be obtained in good yield.

The olefinic compounds which can be converted to epoxides by this process include aliphatic and cycloaliphatic olefines such as cyclohexene, cyclooctene and cyclododecene, and also olefinic compounds carrying substituents which are not oxidisable and which remain stable under the reaction conditions, for example halogen atoms, especially chlorine atoms, or alkoxy groups.

Suitable hydroperoxides for the reaction, which may be primary, secondary or tertiary, include alkyl hydroperoxides, cycloalkyl hydroperoxides and aralkyl hydroperoxides. Cyclohexyl hydroperoxide, which is an industrial product, may be used with advantage; it easily releases its oxygen under the reaction conditions, and furthermore it gives rise to the formation of cyclohexanol which is used for the manufacture of adipic acid. The choice of the hydroperoxide is linked to the working conditions. When these are such that degradation reactions tend to predominate over the epoxidation reaction, stabilisers such as amines may be added to the hydroperoxides.

The borate ester used is preferably an alkyl ester, especially a lower alkyl ($C_1$ to $C_4$) ester and most advantageously methyl borate. Orthoborates are preferably used.

The reaction produces the epoxide corresponding to the olefine used, and also the borate of the alcohol corresponding to the hydroperoxide and the alcohol liberated from the borate ester. In practice it is advantageous to remove this last by distillation as it is formed.

The reaction can be carried out by heating the mixture of reagents, e.g. in proportions of one molecule of hydroperoxide and one third of a molecule of alkyl borate per molecule of olefinic compound; it is however usually preferable to use a higher molecular proportion of the olefinic compound in which case olefinic compound which remains unoxidised serves as a diluent. In fact, it is often preferable to use a rather high dilution of hydroperoxide. Instead of excess olefine, other diluents which are not oxidised, or practically not oxidised, by the hydroperoxide in the presence of the borate and the olefinic compound under the working conditions may be used as diluents, that is to say, organic liquids whose rate of oxidation is zero or very low compared to the rate of expoxidation of the olefinic compound at the temperature used. For example, alkanes such as hexane and heptane, cycloalkanes such as cyclohexane, and aromatic hydrocarbons and their substitution products such as benzene, chlorobenzene, nitrobenzene and cumene may be used. The diluent naturally must also be inert towards the epoxide produced.

As a diluent there may also be used excess of the boric ester, in which case an amount of boric ester greater than one third of a mol per mole of hydroperoxide may be used, the proportion of olefinic compound at the same time being one mole or more per mol of hydroperoxide. Where the boric ester is methyl orthoborate, leaving aside any question of dilution, it is in any case advisable to use more than one third mol per mol of hydroperoxide, because in distilling off the methanol as it is liberated, some methyl borate is carried away in the form of the methyl borate/methanol azeotrope; thus the amount used in addition to the one third mol of methyl borate per mol of hydroperoxide specified above should be at least equal to that lost in this way.

It is possible to use either a relatively highly purified and highly concentrated hydroperoxide, or a more or less technical grade. In particular, the oxidation of the olefinic compound is to be performed in an auxiliary diluent; it is possible to use a technical grade solution of hydroperoxide obtained by oxidising a hydrocarbon of formula RH by means of oxygen, preferably after it has been freed from acid products produced during the oxidation, and adjusted to the desired concentration.

The oxidation of the olefinic compound is carried out with heating, at a temperature which may vary somewhat depending on the particular olefinic compound and the hydroperoxide used. However it is never advisable to work at a temperature above 125° C., because this would favour the thermal decomposition of the hydroperoxide and thus lead simply to a loss of active oxygen.

In carrying out the process, the mixture of reagents, in the proportions chosen on the basis indicated above, may very simply be heated, and the volatile alcohol formed from the alkyl borate distilled off as it appears. It is also possible to introduce the hydroperoxide and alkyl borate progressively into the olefinic compound, optionally mixed with an organic diluent. When all the hydroperoxide has been used, unreacted material can be removed by distillation. The borate formed from the alcohol corresponding to the hydroperoxide may be decomposed by heating with methanol, and after removing the methyl borate formed and unreated methanol, there remains a mixture of epoxide and of the alcohol corresponding to the hydroperoxide; this may be fractionated, for example by distillation.

The following examples illustrate the invention without limiting it. Proportions are by weight.

EXAMPLE 1

The following are charged into a 500 cc. flask:

50 g. of cyclohexene
5.2 g. of cyclohexyl hydroperoxide, 96%
10 cc. of methyl borate.

The flask is fitted with a distillation column, a nitrogen inlet, and two dropping funnels one of which contains 110 cc. of methyl borate and the other 20.8 g. of 96% cyclohexyl hydroperoxide and 25 g. of cyclohexene.

The flask is flushed with nitrogen. It is then heated to the reflux temperature, and when the methanol/methyl borate azeotrope begins to distil over at the head of the column (55° C.), the content of the dropping funnels is allowed to flow in uniformly over the course of 2 hours 10 minutes. Heating and distillation are then continued for 2 hours 30 minutes (T° in the material, 80–83° C.; t° in the vapour, 55° C. initially and 60° C. at the end of the operation). Unreacted methylborate is then eliminated, after which 100 cc. of methanol are added, the mixture is heated to boiling, and a mixture of the methyl borate/methanol and methanol/cyclohexene azeotropes distilled off. The residual methanol is removed by distillation under reduced pressure (100 mm. of mercury). From the residue there is obtained by distillation under reduced pressure (90–95 mm. of mercury) 16.6 g. of a fraction of $B.P._{92}=53–94°$ C. containing 12.8 g. of epoxycyclohexane and 3.06 g. of cyclohexanol, followed by 18.25 g. of a fraction of $B.P._{92}=94–105°$ C. containing 1.46 g. of epoxycyclohexane and 16.5 g. of cyclohexanol. The respective yields of epoxycyclohexane and cyclohexanol, relative to the hydroperoxide introduced, are 67.5% and 91%.

If 10 g. of cyclohexyl hydroperoxide and 100 g. of cyclohexene are reacted in the absence of a borate ester under the same temperature conditions, 55% of unconverted hydroperoxide remains at the end of 19 hours heating and practically no epoxycyclohexane is produced. Moreover it is known that in the absence of borate ester (Brill, loc. cit.) the reaction of cyclohexene with t-butyl hydroperoxide gives only 10–30% of epoxide based on the hydroperoxide.

EXAMPLE 2

The following are charged into the apparatus used in Example 1:

100 g. of cyclooctene
10 g. of cyclohexyl hydroperoxide (0.0862 mole)
40 cc. of methyl borate.

The mixture is heated under reflux and the methyl borate/methanol azeotrope distilled off, while 20 cc. of methyl borate are added at a rate equal to that at which methyl borate is lost in the azeotrope, so as to maintain the temperature in the liquid phase at 110° C. Heating is continued for one hour, after which the mixture is cooled. Unconverted cyclooctene is removed by distillation under reduced pressure (85 mm. of mercury, at 70° C.). The residue is then treated with 100 cc. of methanol and heated to boiling, whereupon there distils over at 60° C. a mixture of the two azeotropes methyl borate/methanol and cyclooctene/methanol; finally, the last traces of methanol are removed by heating to 30° C. under reduced pressure (30 mm. of mercury). 17.37 g. of a mixture containing 8.2 g. of epoxycyclooctane and 8.2 g. of cyclohexanol are isolated from the reaction mixture which has been concentrated in this manner (21.78 g.) by distillation under reduced pressure (18 mm. of mercury).

The molecular yields of epoxycyclooctane and cyclohexanol are respectively 75% and 97% based on the hydroperoxide introduced.

EXAMPLE 3

The following are charged into the apparatus of Example 1:

95 g. of cyclododecene
5.3 g. of cyclohexyl hydroperoxide, 94% (0.043 mol)
20 cc. of methyl borate.

The mixture is heated to 110°–120° C. for 1 hour 30 minutes during which time 15 cc. of methyl borate is added. A methanol/methylborate azeotrope distills off during this heating. After cooling, unreacted methyl borate is driven off under reduced pressure (20 mm. of mercury), and 50 cc. of methanol are then added to the reaction mixture, which is thereafter treated as in Example 1. At the end of the treatment the cyclohexanol, unconverted cyclododecene and epoxycyclododecane are separated by fraction distillation under reduced pressure (5 mm. of mercury). 6.3 g. of epoxycyclododecane are collected at $B.P._{.5}=113–114°$ C. corresponding to a yield of 61% based on the hydroperoxide introduced.

EXAMPLE 4

A mixture of the following substances is heated to boiling in an atmosphere of nitrogen:

17.1 g. of cyclohexyl hydroperoxide, 90%
185 g. of cyclohexane
90 g. of a hydrocarbon fraction of $B.P.=130–140°$ C. containing 83.5% of nonenes and 16.5% of cumene
43 g. of ethyl orthoborate.

The temperature of the mixture is then 92° C. The ethanol/cyclohexane azeotrope ($B.P.=65°$ C.) is then distilled off as fast as it is formed. At the end of 3 hours the vapours coming over are pure cyclohexane, and the reaction mixture is cooled. It consists of 270 g. of a solution found to contain 19 g. of epoxynonanes, representing a yield of 91% based on the hydroperoxide used.

We claim:

1. Process for the manufacture of epoxidised compounds by reaction of olefinic compounds with alkyl, cycloalkyl or aralkyl hydroperoxides, wherein the reaction is carried out in the presence of a borate ester with heating to not above 125° C.

2. Process according to claim 1, wherein a lower alkyl borate is employed.

3. Process according to claim 1, wherein a methyl borate is employed.

4. Process according to claim 1, wherein an orthoborate ester is employed.

5. Process according to claim 1, wherein methyl orthoborate is employed.

6. Process according to claim 1, wherein the alcohol liberated in the reaction from the borate ester is removed from the reaction mixture as it is formed.

7. Process according to claim 3, wherein the methanol liberated from the methyl borate is distilled out of and removed from the reaction mixture as it is formed.

8. Process according to claim 1, wherein at least ⅓ mol of borate ester (excluding any which may be removed unchanged from the reaction zone as the reaction proceeds), and at least one mol of olefinic material, are employed for each mol of hydroperoxide.

9. Process according to claim 7, wherein at least ⅓ mol of methyl borate, in addition to that removed unchanged from the reaction zone as the reaction proceeds, and at least one mol of olefinic material, are employed for each mol of hydroperoxide.

10. Process according to claim 1, wherein the reaction is carried out in the presence as diluent of an organic liquid which under the reaction conditions is inert towards the reactants and the products of the reaction.

11. Process according to claim 1, wherein an aliphatic or cycloaliphatic olefine is epoxidised by reaction with cyclohexyl hydroperoxide.

12. Process according to claim 9, wherein an aliphatic or cycloaliphatic olefine is epoxidised by reaction with cyclohexyl hydroperoxide.

13. Process according to claim 1 wherein the reaction is carried out at 80° to 125° C.

14. The method of preparing an oxirane compound which comprises reacting at elevated temperature in the liquid phase an olefinic compound with a mixture of an organic hydroperoxide and an oxyboron compound.

References Cited

UNITED STATES PATENTS

| 2,801,253 | 7/1957 | Greenspan et al. | 260—348.5 LL |
| 3,210,381 | 10/1965 | Gash | 260—348.5 LV |

FOREIGN PATENTS

| 655,676 | 1/1963 | Canada | 260—348.5 LL |

OTHER REFERENCES

Organoboron Chem., vol. I, by Steinberg, 1964, pp. 478–483.

HENRY R. JILES, Primary Examiner

S. D. WINTERS, Assistant Examiner